US012434338B2

(12) United States Patent
Zhang et al.

(10) Patent No.: US 12,434,338 B2
(45) Date of Patent: Oct. 7, 2025

(54) SAFETY BELT RETRACTOR PRE-WINDING AND BAFFLE INSTALLATION DEVICE (71) Applicant: Yancheng Jia'anle Automation Technology Co., Ltd., Yancheng (CN)

(72) Inventors: Jinlin Zhang, Yancheng (CN); Manman Fu, Yancheng (CN); Shixin Zhu, Yancheng (CN)

(73) Assignee: Yancheng Jia'anle Automation Technology Co.,Ltd., Yancheng (CN)

( * ) Notice: Subject to any disclaimer, the term of this patent is extended or adjusted under 35 U.S.C. 154(b) by 0 days.

(21) Appl. No.: 18/337,993

(22) PCT Filed: Dec. 13, 2022

(86) PCT No.: PCT/CN2022/138649
§ 371 (c)(1),
(2) Date: Jun. 20, 2023

(87) PCT Pub. No.: WO2023/056990
PCT Pub. Date: Apr. 13, 2023

(65) Prior Publication Data
US 2024/0293901 A1  Sep. 5, 2024

(30) Foreign Application Priority Data
Oct. 27, 2022 (CN) .......................... 202211323062.7

(51) Int. Cl.
*B23P 21/00* (2006.01)
*B60R 22/34* (2006.01)
(52) U.S. Cl.
CPC ............. *B23P 21/006* (2013.01); *B60R 22/34* (2013.01); *B60R 2022/3402* (2013.01);
(Continued)

(58) Field of Classification Search
CPC ................... B23P 21/006; B60R 22/34; B60R 2022/3402; Y10T 29/53043;
(Continued)

(56) References Cited

U.S. PATENT DOCUMENTS
2002/0124649 A1    9/2002  Holman

FOREIGN PATENT DOCUMENTS
CN    208556344 U    3/2019
CN    110567806 A    12/2019
(Continued)

OTHER PUBLICATIONS
International search report of PCT/CN2022/138649, Feb. 21, 2023.
Wirriten opinion of PCT/CN2022/138649, Feb. 21, 2023.

*Primary Examiner* — Jermie E Cozart (57) ABSTRACT

A safety belt retractor pre-winding and baffle installation device is provided, including a rotary table, which is provided with a loading station, a winding station, a stop slot positioning station, a baffle installation station, a NG discharging station, and a qualified product discharging station. The rotation shaft of the safety belt retractor is installed on the profiling fixture. After winding to the set number of turns through the winding mechanism, the position of the stop slot is found through the position detection mechanism, and finally the baffle is successfully installed by the multi-axis manipulator. The disclosure also uses the visual sensor to identify the type, control the number of turns of the servo motor in the pre-winding step, and check whether the torque fed back by the servo motor is within the set range, it can realize the processing of products with multiple specifications.

10 Claims, 10 Drawing Sheets (52) U.S. Cl.
CPC .... *Y10T 29/53043* (2015.01); *Y10T 29/53052* (2015.01); *Y10T 29/53374* (2015.01); *Y10T 29/53404* (2015.01)

(58) Field of Classification Search
CPC ......... Y10T 29/53052; Y10T 29/53374; Y10T 29/53404
See application file for complete search history.

(56) References Cited

FOREIGN PATENT DOCUMENTS

| | | | | |
|---|---|---|---|---|
| CN | 110814733 | A | | 2/2020 |
| CN | 210388255 | U | | 4/2020 |
| CN | 111185757 | A * | 5/2020 | ............ B23P 21/006 |
| CN | 210818356 | U | | 6/2020 |
| CN | 215239110 | U | | 12/2021 |

* cited by examiner

SAFETY BELT RETRACTOR PRE-WINDING AND BAFFLE INSTALLATION DEVICE

TECHNICAL FIELD

The disclosure relates to the technical field of automation equipment, in particular to a safety belt retractor pre-winding and baffle installation device.

BACKGROUND

Figure 1:
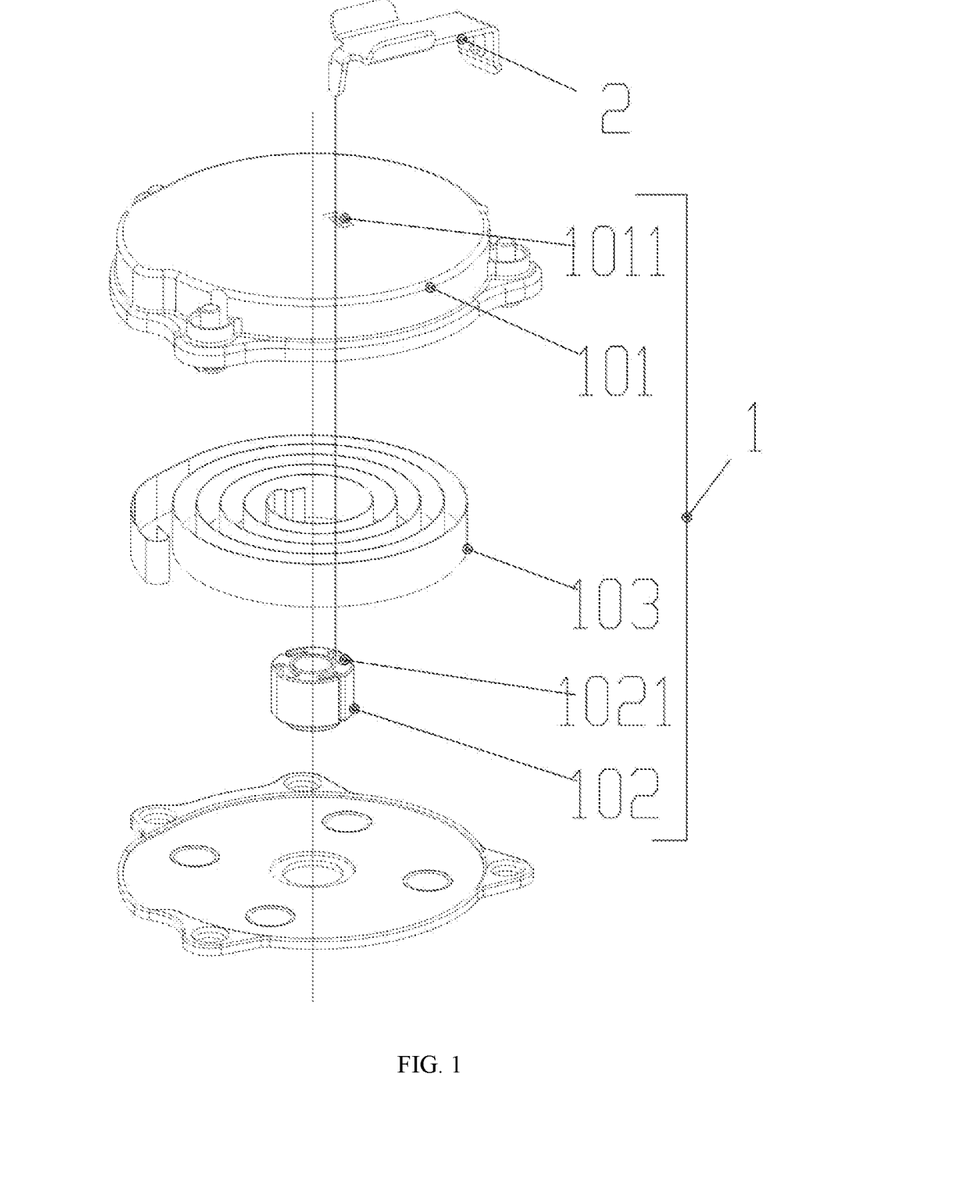
FIG. 1 is a structural exploded view of the safety belt retractor.

As shown in FIG. 1, the safety belt retractor 1 is an important safety component of the vehicle, mainly including the housing 101, the rotation shaft 102, and the coil spring 103, and the coil spring 103 is fixed on the rotation shaft 102 and the housing 101 respectively through the fasteners at both ends. The rotation shaft 102 is rotationally connected to the center of the housing 101. The center of the rotation shaft 102 is provided with a spline groove, which can be inserted into the spline shaft to transmit power to the outside of the housing 101. The other side of the housing 101 is provided with a baffle 2 for temporary fixation, the pin part of the baffle 2 passes through the socket 1011 of the housing 101 and is inserted into the stop slot 1021 of the rotation shaft 102. When the vehicle is assembled, the retractor needs a certain pre-winding force, that is, to ensure that the safety belt still has a certain pre-winding force when it is not worn. If the pre-winding force is controlled by the vehicle manufacturer, it will be very troublesome. Thus, the manufacturer of the safety belt retractor needs to turn the rotation shaft 102 from the fully relaxed state for a fixed number of circles in advance before the product leaves the factory, then fix it with the baffle 2. After the vehicle manufacturer has installed the safety belt retractor 1 and the safety belt, then pulls out the baffle 2, in this way, it will ensure that the pre-winding force of the safety belt retractor 1 of each vehicle is consistent, and ensure that the safety assurance is met.

The safety belt retractor has different specifications for different vehicles. The coil spring of each specification of the retractor needs to be pre-winded in different circles, and when the baffle 2 is installed, the rotation shaft 102 needs to be rotated to the proper position, so that the pin part of the baffle 2 can be inserted smoothly. At present, the existing baffle 2 of the safety belt retractor is installed in manual or semi-automatic mode, which is easy to cause the inconsistency between the pre-tightening circles of coil spring and the set number of circles, resulting in the product not meeting the standard, and the work efficiency is very low, which consumes labor.

SUMMARY

The problem solved by the disclosure is that in conventional operation, manual assembly is inefficient and easy to cause installation quality problems, the disclosure provides a safety belt retractor pre-winding and baffle installation equipment with high automation and installation efficiency.

The disclosure is realized by the following technical solution: a safety belt retractor pre-winding and baffle installation device, including a rotary table, which is provided with a loading station, a winding station, a stop slot positioning station, a baffle installation station, a NG discharging station, and a qualified product discharging station. Each station is provided with profiling fixture, and a ratchet seat with adjustable rotation direction is installed under each profiling fixture. The center of the ratchet seat is provided with a ratchet shaft. The upper end of the ratchet shaft passes through the profiling fixture, and is connected with the rotation shaft of the safety belt retractor installed on the profiling fixture;

A winding mechanism is installed below the winding station, the winding mechanism is installed on the equipment platform, the winding mechanism is located under the ratchet seat at the station; the winding mechanism includes a first lifting mechanism and a first driving mechanism with position feedback and torque feedback; the first lifting mechanism drives the first driving mechanism to lift and lower, the output end of the first driving mechanism is provided with a sleeve; when the first lifting mechanism is lifted, the sleeve is connected with the lower end of the ratchet shaft; the ratchet shaft is driven to rotated by the first driving mechanism; when the first lifting mechanism is lowered, the sleeve and the ratchet shaft are disconnected;

The winding mechanism is also installed below the stop slot positioning station, and the position detection mechanism is also installed above the profiling fixture at the station; the position detection mechanism includes a vertical support, a second lifting mechanism, a installation plate, a displacement sensor, a sliding part, and a detection pin; the vertical support is installed on the equipment platform, the second lifting mechanism and the displacement sensor are fixed on the vertical support, the output end of the second lifting mechanism is provided with a installation plate, the installation plate is slidably connected with a sliding part in the up-down direction, and an upper limit structure and a lower limit structure are installed between the sliding part and the installation plate, an elastic component is also installed between the lower limit structure and the installation plate; the sliding part is connected with the detection shaft of the displacement sensor; the bottom of the sliding part is provided with a detection pin; the section shape of the detection pin is the same as the section shape of the baffle pin, and its section size is not less than the section size of the baffle pin, the detection pin is located above the socket on the housing of the safety belt retractor of the station;

The baffle installation station is provided with a multi-axis manipulator, and a vibrator bowl is installed, the vibrator bowl is transported with a baffle.

Further, the first visual sensor used to judge the color and shape of the upper surface of the housing of the safety belt retractor is installed above the loading station, and the optical fiber sensor used to judge the color of the lower surface of the housing of the safety belt retractor is installed below the loading station, the ratchet seat and the rotary table are provided with a avoidance through hole on the detection path of the optical fiber sensor.

Further, a second visual sensor for judging whether the baffle is installed in place is also installed above the baffle installation station.

Further, the rotary table is also provided with a code spraying station, where a code spraying mechanism for spraying bar code or two-dimensional code is arranged, and a code scanning mechanism for verifying the code spraying information is also arranged beside the code spraying mechanism, and the code spraying mechanism and the code scanning mechanism are arranged side by side, and is installed on the servo sliding table which can move left and right.

Further, the NG discharging station is provided with a two-axis manipulator in a horizontal and vertical direction, a first NG material basket, a second NG material basket, and a chute driven by a cylinder; the first NG material basket is located below the discharging position of the two-axis manipulator, the second NG material basket and the first NG material basket are arranged in front and behind; the chute is driven by the cylinder to move above or to the side of the first NG material basket; when it is above the first NG material basket, the lower opening of the chute is above the second NG material basket.

Further, the qualified product discharging station is provided with a two-axis manipulator in a horizontal and vertical direction and a belt conveyor, and the end of the belt conveyor is provided with a material blocking mechanism.

Further, the vibrator bowl is provided with two sets, which are respectively used for conveying the baffle for the levorotation safety belt retractor and the dextrorotation safety belt retractor.

Further, the first driving mechanism is a servo motor, and the first lifting mechanism is a sliding table cylinder.

Further, the sliding part includes an upper connecting plate, a lower connecting plate and a guide rod, the upper connecting plate and the lower connecting plate are fixedly connected by two guide rods, and the guide rod and the installation plate are slidably connected, the elastic component is a spring, and the spring is sleeved on the guide rod between the lower connecting plate and the installation plate.

Further, the profiling fixture is positioned and installed on the rotary table through a plane and two pins, the profiling fixture is pressed on the rotary table by a fast pressing block, and the profiling fixture is provided with a variety of replaceable specifications.

The advantageous effects of the disclosure are as following:

1. The disclosure adopts the method of pre-winding to the set number of circles, then slowly rotating through the servo motor, and then detecting the position of the stop slot through the displacement sensor and the detection pin. When the stop slot and the socket coincide, the installation of the baffle through the manipulator can effectively ensure the initial torque of the safety belt retractor and improve the installation efficiency.

2. The servo motor of the disclosure is lifted and lowered by the sliding table cylinder. When the sliding table cylinder drives the servo motor to lift, the output end of the servo motor is in transmission connection through the sleeve and the ratchet seat. When the sliding table cylinder drives the servo motor to lower, the servo motor and the ratchet seat are disconnected, and the rotation of the rotation shaft is restricted by the ratchet seat, which is convenient for the ratchet seat to be transferred to other stations after being rolled up.

3. The disclosure completes loading, pre-winding, stop slot position adjustment, baffle installation, code spraying, discharging and other work step by step through a multi-station rotary table, with high assembly efficiency.

4. The disclosure carries out model recognition through the visual sensor, extracts the pre-input winding number and torque range through the control module, controls the rotation number of servo motor in the pre-winding step, and checks whether the torque fed back by the servo motor is within the set range, so as to realize the multi-standard product processing and ensure that there is no error.

The reference numbers in the figures:
1—safety belt retractor; 101—housing; 1011—socket; 102—rotation shaft; 1021—stop slot; 103—coil spring;
2—baffle; 3—rotary table; 4—profiling fixture;
5—ratchet seat; 501—ratchet shaft;
6—winding mechanism; 601—first lifting mechanism; 602—first driving mechanism; 603—sleeve;
7—position detection mechanism; 701—vertical support; 702—second lifting mechanism; 703—installation plate; 704—displacement sensor; 705—sliding part; 7051—upper connecting plate; 7052—lower connecting plate; 7053—guide rod; 706—elastic component; 707—detection pin;
8—multi—axis manipulator; 9—vibrator bowl; 10—code spraying mechanism; 11—code scanning mechanism; 12—servo sliding table; 13—first visual sensor; 14—optical fiber sensor; 15—second visual sensor; 16—two—axis manipulator; 17—first NG material basket; 18—second NG material basket; 19—cylinder; 20—chute; 21—belt conveyor.

DETAILED DESCRIPTION OF THE EMBODIMENTS

The following will give a clear and complete description of the technical solution in the embodiments of the disclosure in combination with the drawings in the embodiments of the disclosure. It is apparent that the described embodiments are only part of the embodiments of the disclosure, not all of them. Based on the embodiments in the disclosure, all other embodiments obtained by ordinary skilled person in the art without creative work fall within the scope of the disclosure.

Figure 2:
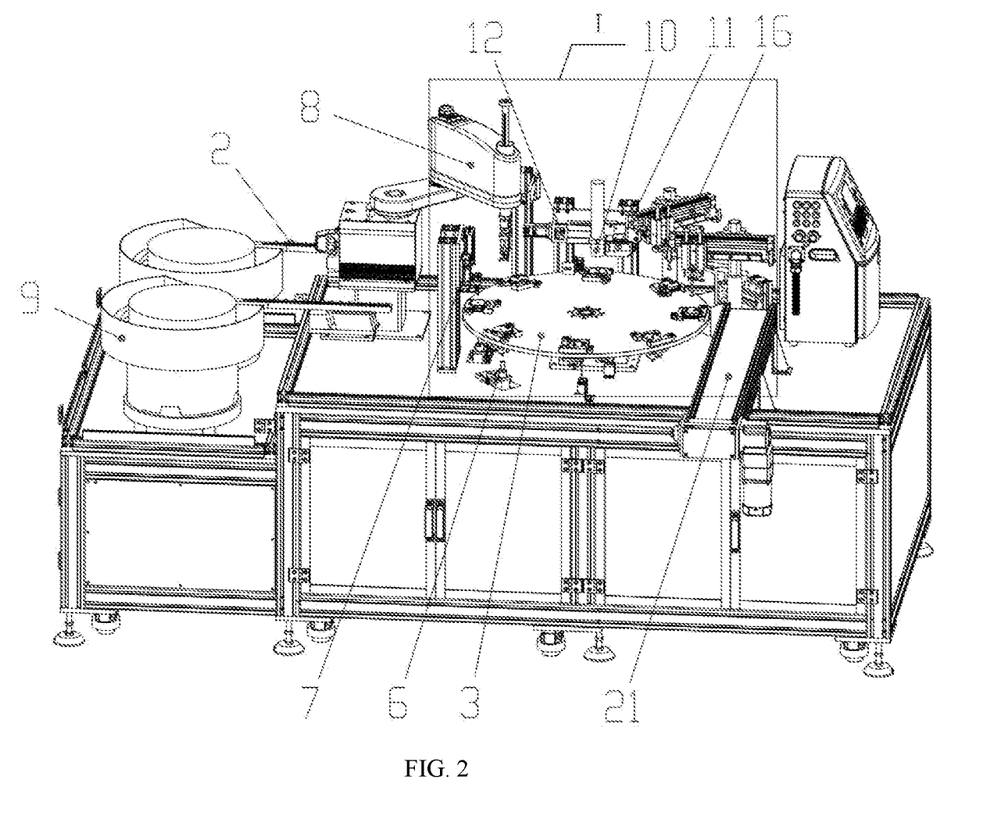
FIG. 2 is a three-dimensional schematic diagram of the safety belt retractor pre-winding and baffle installation device described in the disclosure.
Figure 3:
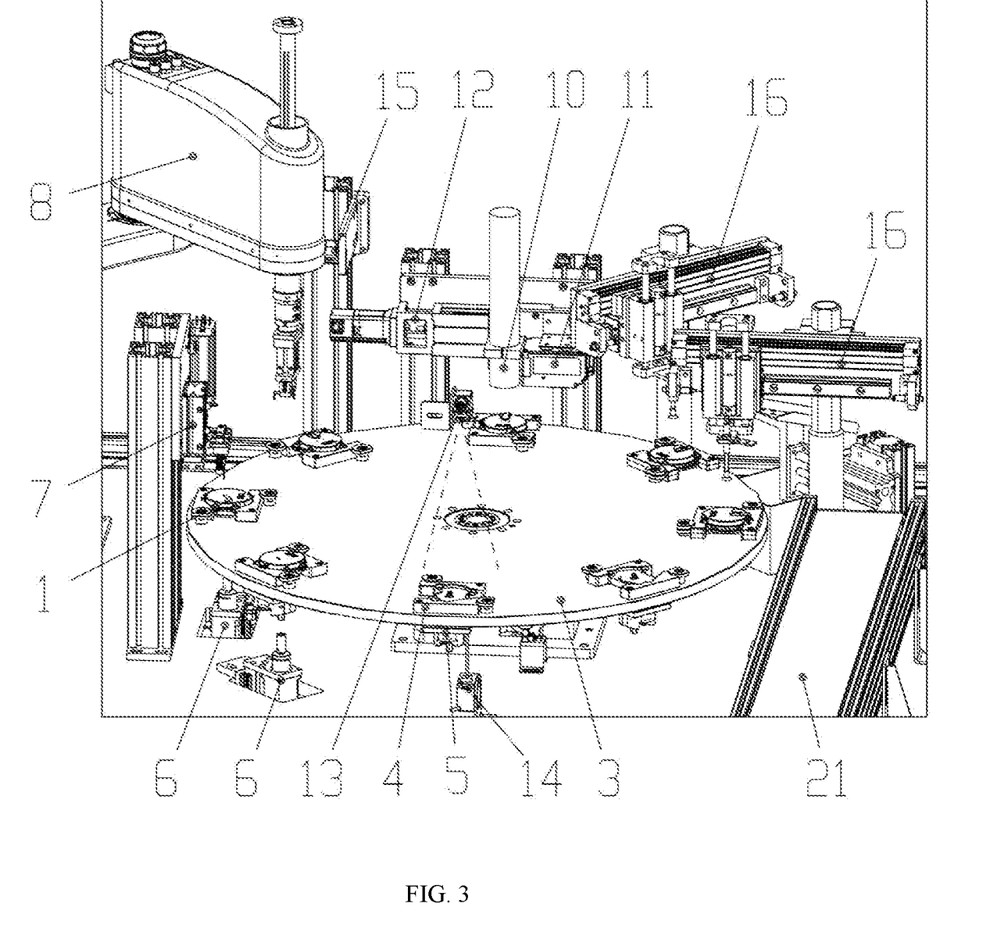
FIG. 3 is a partial enlarged view of Part I in FIG. 2.
Figure 4:
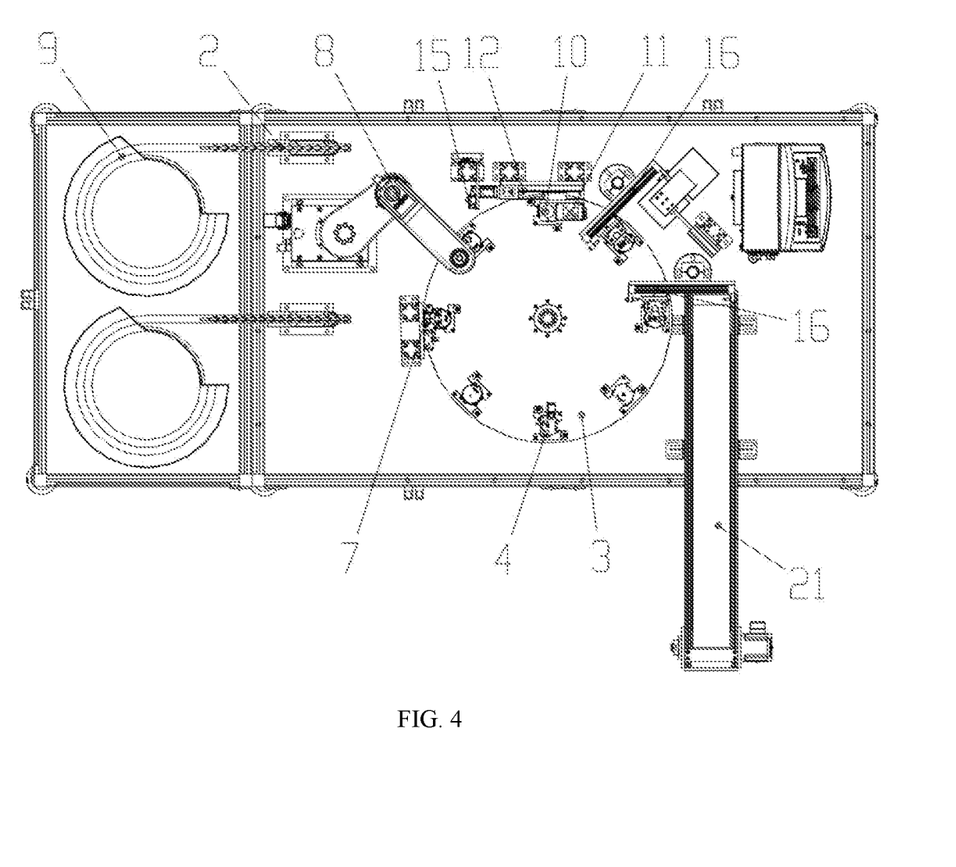
FIG. 4 is a top view of the safety belt retractor pre-winding and baffle installation device described in the disclosure.

As shown in FIGS. 2-4, a safety belt retractor pre-winding and baffle installation device includes a rotary table 3, which is provided with a loading station, a winding station, a stop slot positioning station, a baffle installation station, a NG discharging station, and a qualified product discharging station. A profiling fixture 4 is installed on each station. The profiling fixture 4 is positioned by means of a plane and two pins, and is pressed on the rotary table 3 by a fast pressing block. The profiling fixture 4 is provided with a variety of replaceable specifications. A ratchet seat 5 with adjustable rotation direction is installed under each profiling fixture 4. The center of the ratchet seat 5 is provided with a ratchet shaft 501, and the ratchet shaft 501 can only rotate in one direction, when turning in the other direction, it will be locked. The ratchet seat 5 is provided with an adjusting lever, when the adjusting lever is shifted, the rotation direction can be changed. The upper end of the ratchet shaft 501 passes through the profiling fixture 4. The center of a rotation shaft 102 of the safety belt retractor 1 is provided with a spline groove. The upper end of the ratchet shaft 501 is provided with a guide structure, and the ratchet shaft 501 is inserted into the spline groove in the center of the rotation shaft 102 to form a transmission connection. The main work at the loading station is to load the material manually or mechanically. The safety belt retractor 1 is installed on the profiling fixture 4, and a drive connection is formed between the ratchet shaft 501 and the rotation shaft 102 of the safety belt retractor 1.

Figure 5:
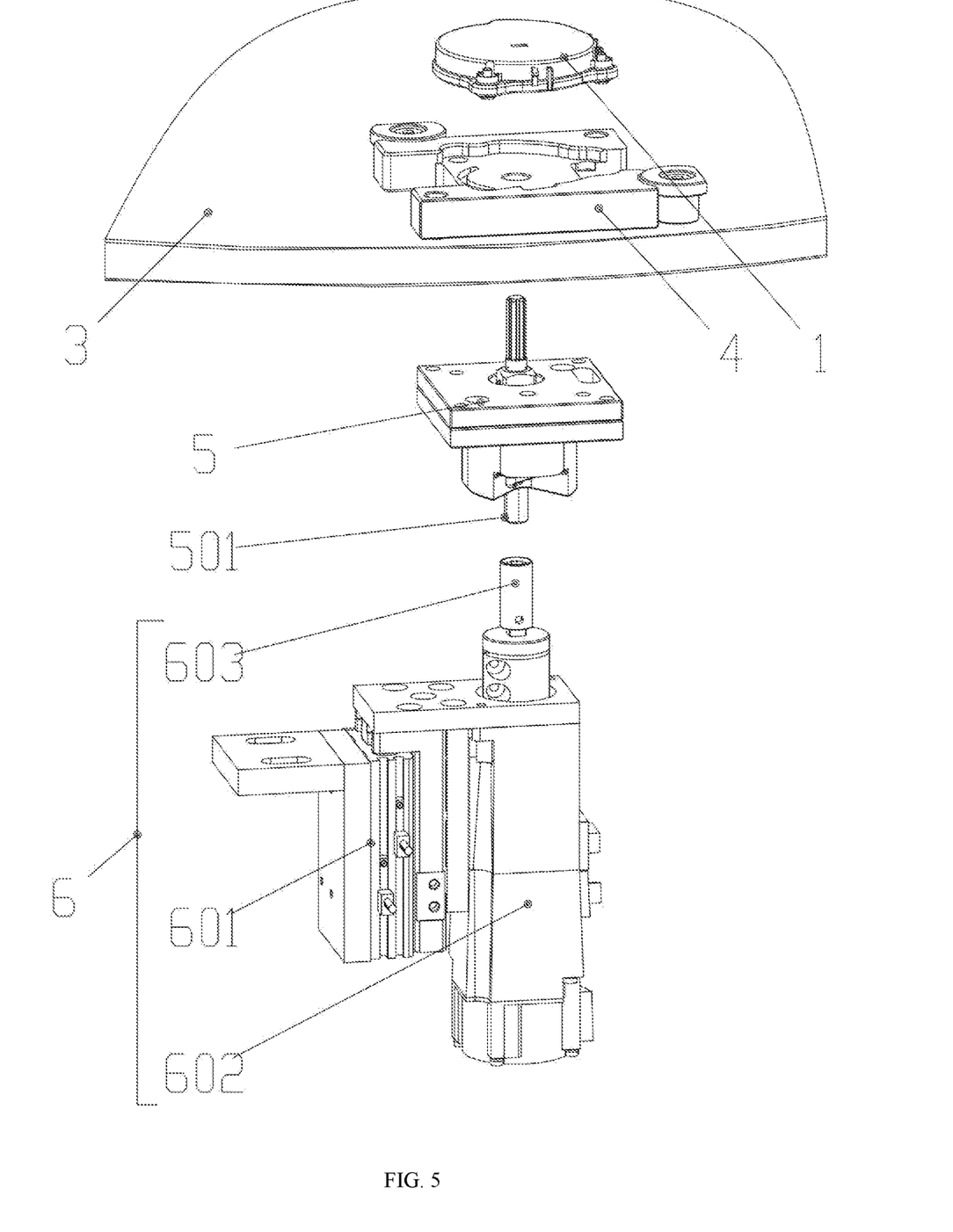
FIG. 5 is a three-dimensional schematic diagram of the winding mechanism.

As shown in FIG. 5, a winding mechanism 6 is arranged under the winding station, which is installed on the equipment platform. The winding mechanism 6 is located under the ratchet seat 5 at the station, and the winding mechanism 6 includes a first lifting mechanism 601 and a first driving mechanism 602 with position feedback and torque feedback. In practical application, the first driving mechanism 602 is a servo motor, and the first lifting mechanism 601 is a sliding table cylinder. The sliding table cylinder drives the servo motor to lift and lower. The output end of the servo motor is provided with a sleeve 603, which is a 12-angle sleeve. The lower part of the ratchet shaft 501 is a hexagonal shaft. Both the sleeve 603 and the hexagonal shaft are provided with a guide structure. When the sliding table cylinder drives the servo motor to lift, the sleeve 603 and the lower end of the ratchet shaft 501 will smoothly form a transmission connection, and the ratchet shaft 501 is driven and rotated by the first driving mechanism 602. When the first lifting mechanism 601 is lowered, the sleeve 603 and the ratchet shaft 501 are disconnected. For example, when the rotation shaft 102 of the safety belt retractor 1 with a certain specification rotates 21±0.5 turns from the fully relaxed state, the torque meets the requirements, then at the winding station, the sliding table cylinder drives the servo motor to lift, the sleeve 603 and the ratchet shaft 501 form a transmission connection, the servo motor drives the rotation shaft 102 to rotate 21 turns at a faster speed, and then the sliding table cylinder lowers, the sleeve 603 and the ratchet shaft 501 are disconnected, and the coil spring 103 tends to drive the rotation shaft 102 to reverse, because the ratchet shaft 501 is locked due to reverse rotation, the rotation shaft 102 remains in the state of 21 turns. During the winding process, the servo motor monitors the torque at the same time to ensure that the torque is also within a reasonable range.

Figure 6:
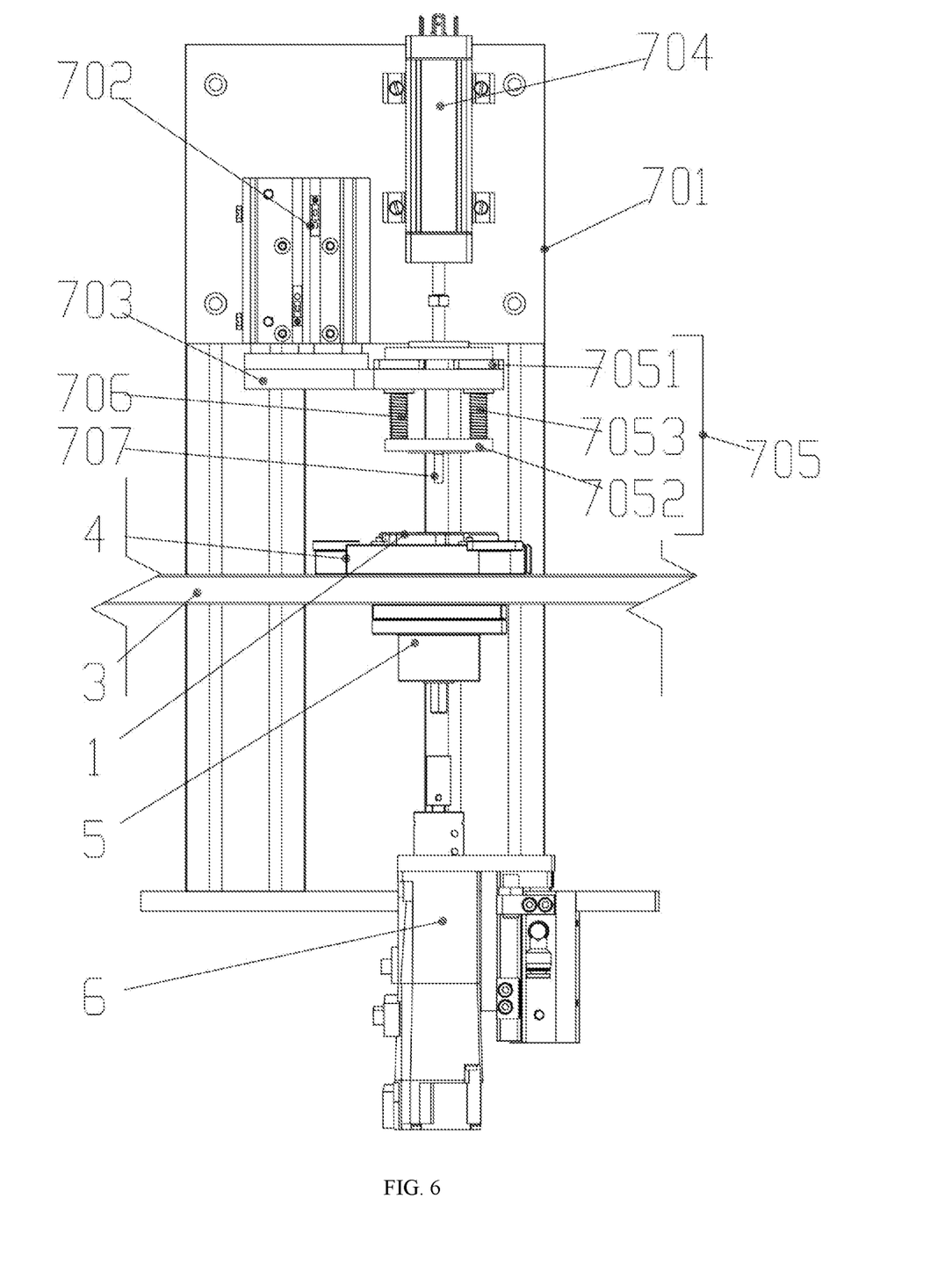
FIG. 6 is a front view of the position detection mechanism.
Figure 7:
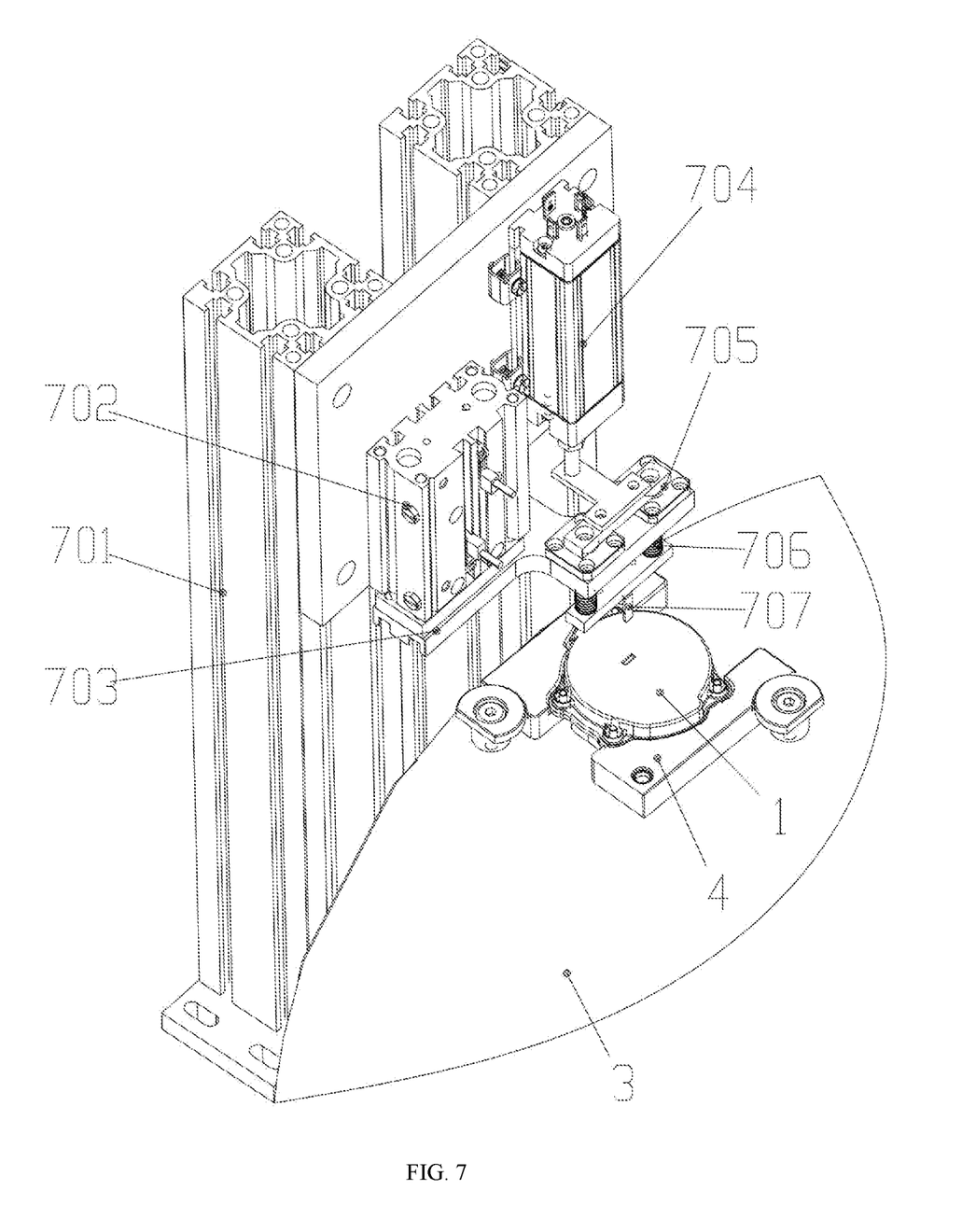
FIG. 7 is a three-dimensional schematic diagram of the position detection mechanism.

As shown in FIG. 6-7, the winding mechanism 6 is also arranged under the stop slot positioning station, and the position detection mechanism 7 is also arranged above the profiling fixture 4 at the station. The position detection mechanism 7 includes a vertical support 701, a second lifting mechanism 702, a installation plate 703, a displacement sensor 704, a sliding part 705, and a detection pin 707. The vertical support 701 is installed on the equipment platform, the second lifting mechanism 702 and the displacement sensor 704 are fixed on the vertical support 701. The output end of the second lifting mechanism 702 is provided with a installation plate 703, the installation plate 703 is slidably connected with a sliding part 705 in the up-down direction. The sliding part 705 includes an upper connecting plate 7051, a lower connecting plate 7052, and a guide rod 7053, and the upper connecting plate 7051 and the lower connecting plate 7052 are fixedly connected by two guide rods 7053. The guide rod 7053 is slidably connected with the installation plate 703. The elastic component 706 is a spring, and the spring sleeve is located on the guide rod 7053, between the lower connecting plate 7052 and the installation plate 703. The upper connecting plate 7051 is connected with the detection shaft of the displacement sensor 704. The bottom of the lower connecting plate 7052 is provided with a detection pin 707. The section shape of the detection pin 707 is the same as that of the pin of the baffle 2, and its sectional dimension is not less than the sectional dimension of the pin of the baffle 2. The detection pin 707 is located above the socket 1011 on the housing 101 of the safety belt retractor 1 at the station.

At the winding station, the rotation shaft 102 has moved for 21 turns, but the stop slot 1021 on the rotation shaft 102 may not be aligned with the position of the socket 1011. There are two stop slots 1021 on the rotation shaft 102, so the rotation shaft 102 rotates to more than half a turn, and the stop slot 1021 must overlap with the socket 1011 once. Therefore, at the stop slot positioning station, the rotation shaft 102 is driven to rotate by the winding mechanism 6 at the station, and the position detection mechanism 7 detects whether the stop slot 1021 is in place, the main work of this station is to adjust the stop slot 1021 to the lower position of the socket 1011 of the housing 101, so as to ensure that the pin of the baffle 2 can be smoothly inserted into the stop slot 1021 when the baffle 2 is installed later.

Specifically, the second lifting mechanism 702 drives the installation plate 703 to lower, and the sliding part 705 moves downward under the spring force. The detection pin 707 is inserted into the socket 1011 of the housing, which forms an elastic contact with the rotation shaft 102. The winding mechanism 6 under this station works the same as the winding mechanism 6 of the winding station, which lifts first to complete the transmission connection, and then drives the rotation shaft 102 to rotate. The difference is that the servo motor of this station drives the rotation shaft 102 to rotate at a relatively slow speed. When the displacement sensor 704 generates a displacement signal and the displacement value is within the set displacement value range, it indicates that the stop slot 1021 coincides with the socket 1011, and the detection pin 707 has been inserted into the stop slot 1021 under the spring force. So far, the winding mechanism 6 of this station stops working and is disconnected, and the position detection mechanism 7 resets, the detection pin 707 is separated from the safety belt retractor 1, and the rotation shaft 102 is still kept in the coincidence state of the stop slot 1021 and the socket 1011 under the action of the ratchet seat 5. The work of this station is completed.

The baffle installation station is provided with a multi-axis manipulator 8 and a vibrator bowl 9. The vibrator bowl 9 is provided with a baffle 2. In practical application, the vibrator bowl 9 is provided with two sets, which are respectively used for conveying the baffle plates 2 for the levorotation safety belt retractor 1 and the dextrorotation safety belt retractor 1. Due to the different rotation directions of the safety belt retractor, the shape of the baffle 2 used is also different. At this station, the multi-axis manipulator 8 takes the material from the corresponding vibrator bowl 9, and then inserts the pin part of the baffle 2 into the stop slot of the safety belt retractor 1. So far, the pre-winding of the coil spring and the installation of the baffle have been completed, and NG discharging or qualified product discharging has been carried out in the subsequent stations to complete the whole set of work.

As shown in FIG. 3, in practical application, there are many specifications of safety belt retractor 1. However, in order to achieve versatility and reduce costs, many of them adopt the same shape, but the required initial torque is not consistent with the number of coils. Therefore, the upper and lower colors and models of the housing 101 are used to distinguish. In order to realize automatic identification of models, the first visual sensor 13 used to judge the color and shape of the upper surface of the housing 101 of the safety belt retractor 1 is arranged above the loading station, and the optical fiber sensor 14 used to judge the color of the lower surface of the housing 101 of the safety belt retractor 1 is arranged below the loading station. The ratchet seat 5 and the rotary table 3 are provided with an avoidance through hole on the detection path of the optical fiber sensor 14. The color and contour of the upper and lower surfaces of the housing are identified by the first visual sensor and the optical fiber sensor, and the specific model of the safety belt retractor 1 is determined, which is used to control the specific number of turns of the winding mechanism 6 at the winding station, and ensure that the torque is controlled within a reasonable range.

As shown in FIG. 3, in practical application, a second visual sensor 15 for determining whether the baffle 2 is installed in place is also installed above the baffle installation station. After the baffle 2 is installed, the second visual sensor 15 is used to detect whether the pin of the baffle 2 is fully inserted into the stop slot 1021. If the baffle is detected to be warped or without baffle, the first NG product signal will be sent.

Figure 8:
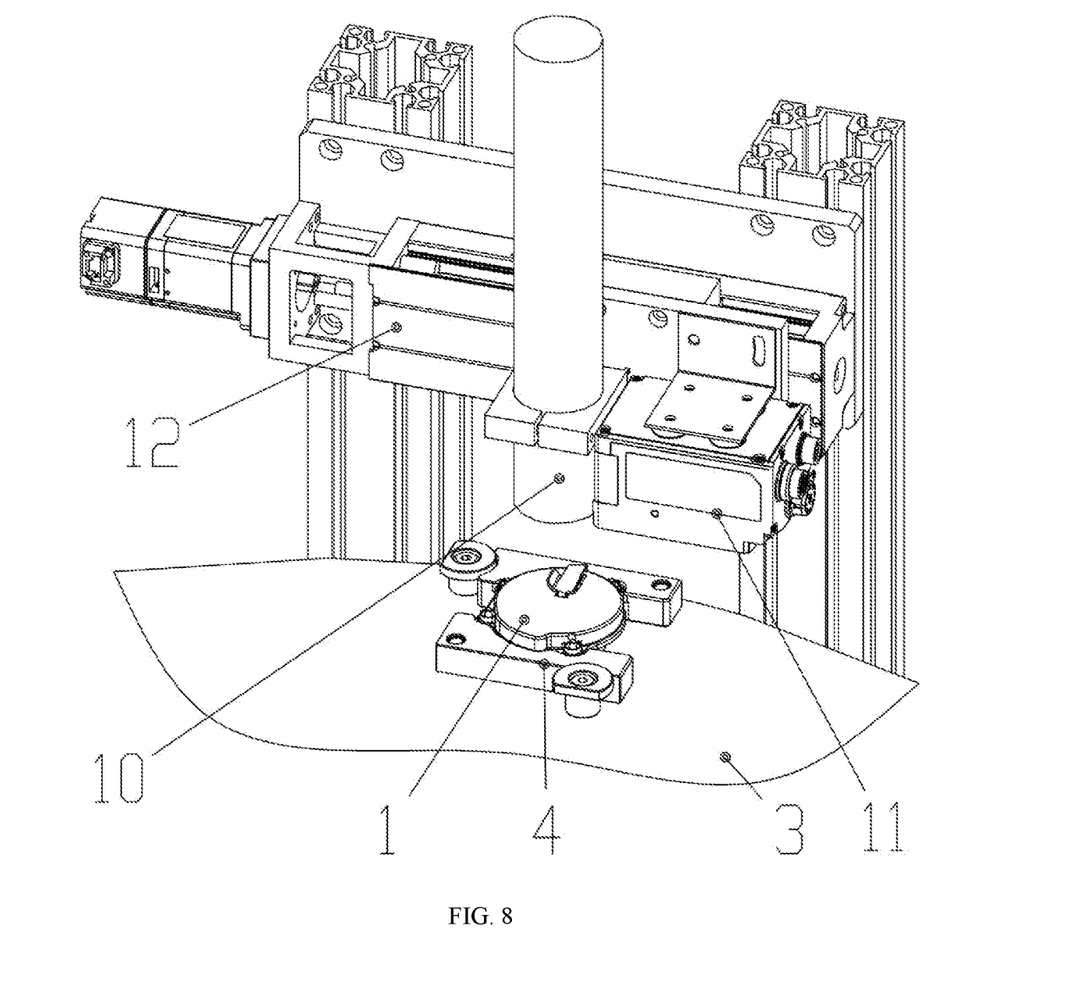
FIG. 8 is a three-dimensional schematic diagram of the code spraying mechanism and the code scanning mechanism.

As shown in FIG. 8, in practical application, the rotary table 3 is also provided with a code spraying station, a code spraying mechanism 10 for spraying bar code or two-dimensional code is arranged on the code spraying station, a code scanning mechanism 11 for verifying the code spraying information is also arranged beside the code spraying mechanism 10, the code spraying mechanism 10 and the code scanning mechanism 11 are arranged side by side, and are installed on a servo sliding table 12 which is movable in left-right direction, the code spraying mechanism 10 generally sprays the two-dimensional code on the housing 101, one machine one code. The two-dimensional code covers the specifications, model, shell color, initial torque, number of pre-winding and other information of the seat belt retractor 1, and then the servo sliding table 12 moves the code scanning mechanism 11 to the top of the safety belt retractor 1 at the station to scan the code, which is used to check whether the two-dimensional code is accurately sprayed. If the spraying is fuzzy or missing, the code scanning mechanism 11 cannot recognize it, sending the second NG product signal.

Figure 9:
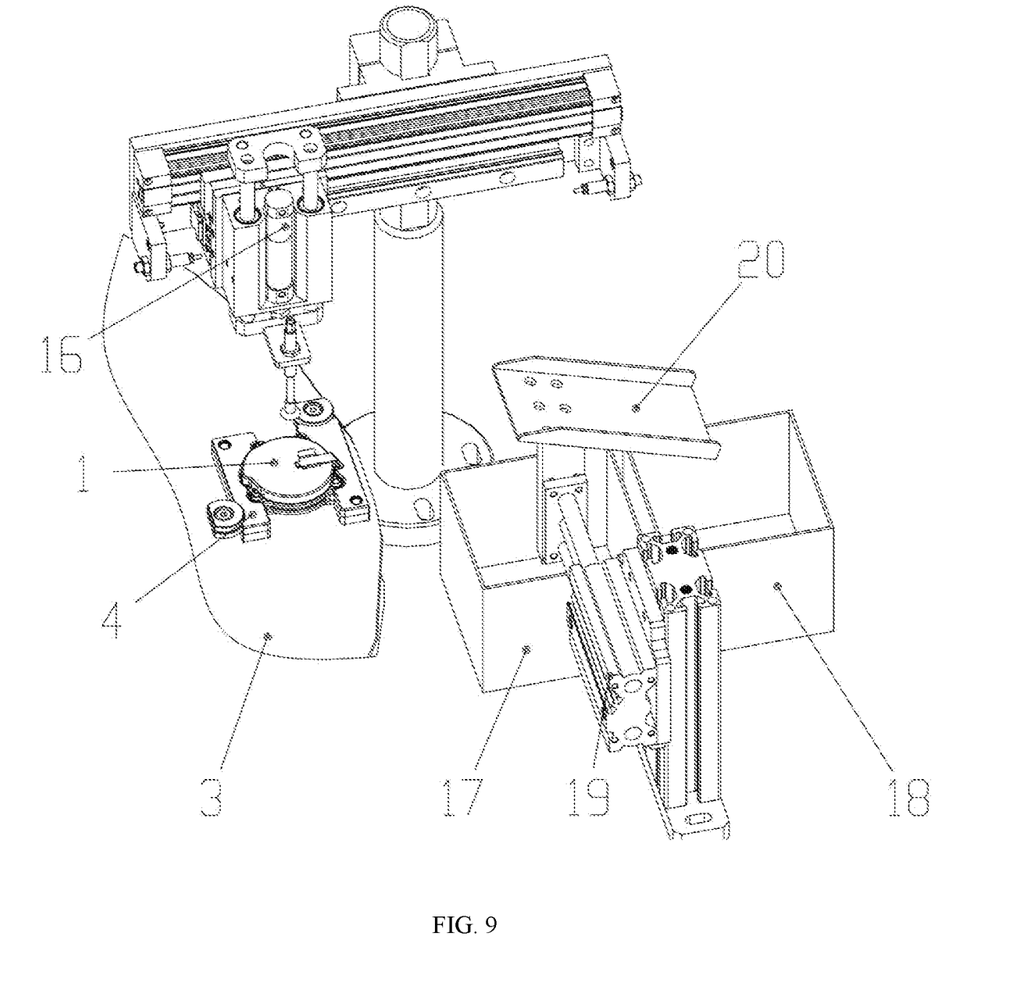
FIG. 9 is a three-dimensional schematic diagram of the NG discharging station.

As shown in FIG. 9, in practical application, the NG discharging station is provided with a two-axis manipulator 16 in the horizontal and the vertical directions, a first NG material basket 17, a second NG material basket 18, and a chute 20 driven by a cylinder 19. The first NG material basket 17 is located below the discharging position of the two-axis manipulator 16, the second NG material basket 18 and the first NG material basket 17 are arranged in front and back, and the chute 20 is driven by a cylinder 19 to move above or to the side of the first NG material basket 17, when it is located above the first NG material basket 17, the lower opening of the chute 20 is located above the second NG material basket 18.

When the product at the NG discharging station has the first NG signal, the cylinder 19 retracts, and the two-axis manipulator 16 takes the material and puts it directly into the first NG material basket 17. When the product at the NG discharging station has the second NG signal, the cylinder 19 extends, and the chute 20 moves to the top of the first NG material basket 17, then the two-axis manipulator 16 takes the material and puts it directly on the chute 20, and slides into the second NG material basket 18 through the guide of the chute 20. Different NG products can be put into different material baskets to facilitate subsequent targeted rework, wherein the term "NG" in the above description means "Not Good", and the NG products refer to the unqualified products.

Figure 10:
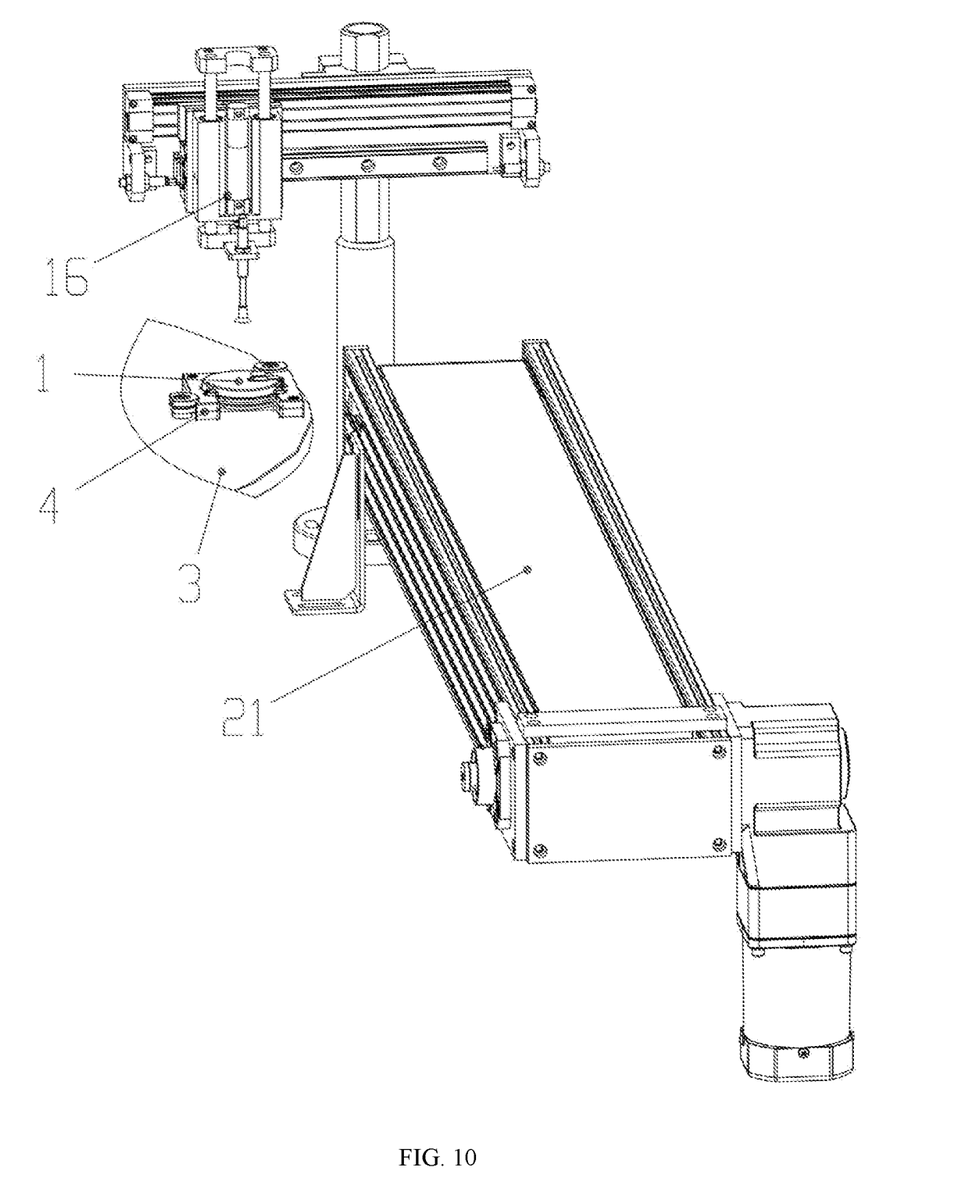
FIG. 10 is a three-dimensional schematic diagram of the qualified product discharging station.

As shown in FIG. 10, in practical application, the qualified product discharging station is provide with a horizontal and vertical two-axis manipulator 16 and a belt conveyor 21, and the end of the belt conveyor 21 is provided with a material blocking mechanism. The two-axis manipulator 16 of this station moves the qualified products to the belt conveyor 21. The qualified products are transported to the outside of the equipment by the belt conveyor 21 and blocked by the material blocking mechanism. Multiple qualified products can be stored and then removed manually or by the manipulator.

In conclusion, the safety belt retractor pre-winding and baffle installation device described in the disclosure can determine the product specification through visual inspection, and then carry out automatic pre-winding, adjustment, baffle installation, code spraying, discharging and other work according to the specification, greatly improving the assembly efficiency.

The basic principle, main features and advantages of the disclosure are shown and described above. The skilled person in the art should understand that the above embodiment is only to illustrate the technical concept and characteristics of the disclosure, and its purpose is to enable people familiar with the technology to understand the content of the disclosure and implement it, and cannot limit the scope of the disclosure. Any equivalent changes or modifications made according to the spirit of the disclosure should be within in the scope of the disclosure.

What is claimed is:

1. A safety belt retractor pre-winding and baffle installation device, comprising a rotary table (3), wherein the rotary table (3) is provided with a loading station, a winding station, a stop slot positioning station, a baffle installation station, a not good (NG) discharging station, and a qualified product discharging station; each station is provided with a profiling fixture (4), and a ratchet seat (5) with adjustable rotation direction is installed under each profiling fixture (4), a center of the ratchet seat (5) is provided with a ratchet shaft (501), an upper end of the ratchet shaft (501) passes through the profiling fixture (4), and is connected with a rotation shaft (102) of the safety belt retractor (1) installed on the profiling fixture (4);

a winding mechanism (6) is installed below the winding station, the winding mechanism (6) is installed on an equipment platform, and the winding mechanism (6) is located under the ratchet seat (5) at the winding station; the winding mechanism (6) comprises a first lifting mechanism (601) and a first driving mechanism (602) with position feedback and torque feedback; the first lifting mechanism (601) drives the first driving mechanism (602) to lift and lower, an output end of the first driving mechanism (602) is provided with a sleeve (603); when the first lifting mechanism (601) is lifted, the sleeve (603) is a 12-angle sleeve, a lower part of the ratchet shaft (501) is a hexagonal shaft, the sleeve (603) and the hexagonal shaft are respectively provided with a guide structure, when the first lifting mechanism (601) lifts, the sleeve (603) is raised, the sleeve (603) cooperates with the hexagonal shaft of the ratchet shaft (501) to form a transmission connection for transmitting rotational motion, and the ratchet shaft (501) is driven to rotate by the first driving mechanism (602);

when the first lifting mechanism (601) is lowered, the sleeve (603) and the ratchet shaft (501) are disconnected;

the winding mechanism (6) is further installed below the stop slot positioning station, and a position detection mechanism (7) is further installed above the profiling fixture (4) at the stop slot positioning station; the position detection mechanism (7) comprises a vertical support (701), a second lifting mechanism (702), an installation plate (703), a displacement sensor (704), a sliding part (705), and a detection pin (707); the vertical support (701) is installed on the equipment platform, the second lifting mechanism (702) and the displacement sensor (704) are fixed on the vertical support (701), an output end of the second lifting mechanism (702) is provided with the installation plate (703), the installation plate (703) is slidably connected with the sliding part (705) in an up-down direction, an upper limit structure and a lower limit structure are installed between the sliding part (705) and the installation plate (703), and elastic components (706) are installed between the lower limit structure and the installation plate (703); the sliding part (705) is connected with a detection shaft of the displacement sensor (704); a bottom of the sliding part (705) is provided with the detection pin (707); a section shape of the detection pin (707) is the same as a section shape of a pin of the baffle (2), and a section size of the detection pin is not less than a section size of the pin of the baffle (2), the detection pin (707) is located above a socket (1011) on the housing (101) of the safety belt retractor (1) at the stop slot positioning station;

the baffle installation station is provided with a multi-axis manipulator (8) and installed with a vibrator bowl (9), and the vibrator bowl (9) is transported with the baffle (2).

2. The safety belt retractor pre-winding and baffle installation device according to claim 1, wherein a first visual sensor (13) configured to determine the color and shape of an upper surface of the housing (101) of the safety belt retractor (1) is installed above the loading station, and an optical fiber sensor (14) configured to determine the color of a lower surface of the housing (101) of the safety belt retractor (1) is installed below the loading station, the ratchet seat (5) and the rotary table (3) are provided with an avoidance through hole on a detection path of the optical fiber sensor (14).

3. The safety belt retractor pre-winding and baffle installation device according to claim 2, wherein a second visual sensor (15) for determining whether the baffle (2) is installed in place is installed above the baffle installation station.

4. The safety belt retractor pre-winding and baffle installation device according to claim 3, wherein the rotary table (3) is further provided with a code spraying station, a code spraying mechanism (10) for spraying bar code or two-dimensional code is arranged at the code spraying station, and a code scanning mechanism (11) for verifying code spraying information is arranged beside the code spraying mechanism (10), and the code spraying mechanism (10) and the code scanning mechanism (11) are arranged side by side, and is installed on a servo sliding table (12) which is capable to move left and right.

5. The safety belt retractor pre-winding and baffle installation device according to claim 4, wherein the NG discharging station is provided with a two-axis manipulator (16) moving along a horizontal direction and a vertical direction, a first NG material basket (17), a second NG material basket (18), and a chute (20) driven by a cylinder (19); the first NG material basket (17) is located below a discharging position of the two-axis manipulator (16), the second NG material basket (18) and the first NG material basket (17) are arranged in front and back; the chute (20) is driven by the cylinder (19) to move above or to a side of the first NG material basket (17); when it is above the first NG material basket (17), a lower opening of the chute (20) is above the second NG material basket (18).

6. The safety belt retractor pre-winding and baffle installation device according to claim 5, wherein the qualified product discharging station is provided with a two-axis manipulator (16) moving along a horizontal direction and a vertical direction and a belt conveyor (21), and an end of the belt conveyor (21) is provided with a material blocking mechanism.

7. The safety belt retractor pre-winding and baffle installation device according to claim 1, wherein the vibrator bowl (9) is provided with two sets, which are respectively used for conveying the baffle (2) for a levorotation safety belt retractor (1) and a dextrorotation safety belt retractor (1).

8. The safety belt retractor pre-winding and baffle installation device according to claim 1, wherein the first driving mechanism (602) is a servo motor, and the first lifting mechanism (601) is a sliding table cylinder.

9. The safety belt retractor pre-winding and baffle installation device according to claim 1, wherein the sliding part (705) comprises an upper connecting plate (7051), a lower connecting plate (7052) and guide rods (7053), the upper connecting plate (7051) and the lower connecting plate (7052) are fixedly connected by two guide rods (7053), and the guide rods (7053) and the installation plate (703) are slidably connected, the elastic components (706) are springs, and the springs are sleeved on the guide rods (7053) between the lower connecting plate (7052) and the installation plate (703).

10. The safety belt retractor pre-winding and baffle installation device according to claim 1, wherein the profiling fixture (4) is positioned and installed on the rotary table (3) through a plane and two pins, the profiling fixture (4) is pressed on the rotary table (3) by a fast pressing block, and the profiling fixture (4) is provided with a variety of replaceable specifications.

* * * * *